(12) United States Patent
Sayers et al.

(10) Patent No.: US 6,542,754 B1
(45) Date of Patent: Apr. 1, 2003

(54) SYNCHRONIZING CLOCK SIGNALS IN WIRELESS NETWORKS

(75) Inventors: Ian Leslie Sayers, Redwood City, CA (US); Paul Jan Long, San Francisco, CA (US); Peter Kendall Cripps, Redwood City, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/310,566

(22) Filed: May 12, 1999

(51) Int. Cl.[7] .......................... H04B 7/01; H04B 7/015; H04B 7/00; H04Q 7/20
(52) U.S. Cl. ...................... 455/502; 455/422; 455/507; 370/350; 370/503
(58) Field of Search .............................. 455/422, 502, 455/503, 507, 524, 561, 442; 370/350, 503, 518

(56) References Cited

U.S. PATENT DOCUMENTS

| | | | | |
|---|---|---|---|---|
| 5,261,118 A | * | 11/1993 | Vanderspool, II et al. | 455/502 |
| 5,448,570 A | * | 9/1995 | Toda et al. | 455/502 |
| 5,473,668 A | | 12/1995 | Nakahara | 379/58 |
| 5,613,211 A | * | 3/1997 | Matsuno | 455/502 |
| 5,784,368 A | | 7/1998 | Weigand et al. | 370/310 |
| 5,864,592 A | * | 1/1999 | Itri | 375/375 |
| 5,875,183 A | * | 2/1999 | Nitadori | 455/456 |
| 6,014,376 A | * | 1/2000 | Abreu et al. | 370/350 |
| 6,108,550 A | * | 8/2000 | Wiorek et al. | 455/503 |
| 6,134,234 A | * | 10/2000 | Kapanen | 455/502 |

FOREIGN PATENT DOCUMENTS

| | | |
|---|---|---|
| EP | 0 732817 A2 | 9/1996 |
| EP | 0 903873 A1 | 3/1999 |
| FR | 2 744864 A1 | 2/1996 |
| WO | WO 94/18764 | 8/1994 |

* cited by examiner

*Primary Examiner*—William Trost
*Assistant Examiner*—Simon Nguyen
(74) *Attorney, Agent, or Firm*—Hamilton, Brook, Smith & Reynolds, P.C.

(57) ABSTRACT

A communications system extends over a cellular region formed of a plurality of wireless cells where each cell covers a portion of the cellular region. Each cell has a base station clock unit that facilitates reliable and accurate synchronization with other clocks units in other cells using a master clock signal from a global positioning system (GPS) or other accurate frequency source. The clock unit in each cell includes a local clock providing a local clock signal for clocking the cell. A master clock source provides one or more master clock signals and a clock synchronizer receives the master clock signals and forms a synchronizing master clock signal for synchronizing the local clock signal. In one or more of the wireless cells of the communication system, the clock unit is a master clock unit which includes a clock distributor for distributing a distributed master clock signal to one or more other wireless cells having slave clock units.

23 Claims, 10 Drawing Sheets

SYNCHRONIZING CLOCK SIGNALS IN WIRELESS NETWORKS

CROSS-REFERENCE TO RELATED APPLICATIONS

Title: METHOD AND APPARATUS FOR INTEGRATED WIRELESS COMMUNICATIONS IN PRIVATE AND PUBLIC NETWORK ENVIRONMENTS;
Inventors: Ian Leslie Sayers, Paul Jan Long, Sheausong Yang;
SC/Ser.No.: 09/188,856;
Title: METHOD AND APPARATUS FOR CONTROLLING WIRELESS NETWORKS
Inventors: Ian Leslie Sayers, Paul Jan Long, Peter K. Cripps
SC/Ser.No.: 09/271,596;
Atty Doc. No.: JETC1001DEL.

BACKGROUND OF THE INVENTION

The present invention is a method and apparatus that provides for the synchronizing of clock signals in wireless networks.

Conventional Cellular Systems

Present day cellular mobile telephone systems provide for a large and increasing demand for mobile services. Cellular systems "reuse" frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Services Switching Center (MSC). In a typical cellular system, one or more MSCs will be used over the covered region. Each MSC can service a number of base stations and associated cells in the cellular system and supports switching operations for routing calls between other systems (such as the PSTN) and the cellular system or for routing calls within the cellular system.

Base stations are typically controlled from the MSC by means of a Base Station Controller (BSC). The BSC assigns RF carriers to support calls, coordinates the handoff of mobile users between base stations, and monitors and reports on the status of base stations. The number of base stations controlled by a single MSC depends upon the traffic at each base station, the cost of interconnection between the MSC and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

Conventional cellular implementations employ one of several techniques to reuse RF bandwidth from cell to cell over the cellular domain. The power received from a radio signal diminishes as the distance between transmitter and receiver increases. Conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere with the carrier in the given cell. The determination of how far away reuse sites must be and of what constitutes significant interference are implementation-specific details. The cellular Advanced Mobile Phone System (AMPS) currently in use in the United States employs FDMA communications between base stations and mobile cellular telephones.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods. The Global System for Mobile Communications (GSM), PCS1900, IS-136, and PDC standards are examples of TDMA methods in current use.

The present specification uses a GSM system for purposes of explanation but the present invention applies to any wireless system protocol.

GSM Cellular Systems

The GSM system architecture is described, for example, in detail by M. Mouly and M.-B. Pautet, The GSM System for Mobile Communications, 1992 and Mouly and M.-B. Pautet, *GSM Protocol Architecture: Radio Sub-system Signaling,* IEEE 41st Vehicular Technology Conference, 1991. The following sections highlight some unique aspects of GSM systems.

The GSM system specifications incorporate many advanced services and features including:
 ISDN compatibility based upon Q.931
 World-wide roaming with other GSM networks
 Two way messaging
 Data Services FAX Services ISDN Supplementary Services.

However, the GSM system is designed fundamentally for use in a traditional Circuit Switched environment that uses 64 kbps voice and data transport.

GSM System Architecture

The standard GSM network includes three major components, namely, the Mobile Station (MS), Base Station Sub-System (BSS) and the Network Sub-System (NSS). The GSM Specifications define the network entities and their associated interfaces within the Public Land Mobile Network (PLMN). The complete suite of specifications also includes documents that define the type approval procedures for mobile stations allowing mobile stations to be used in different countries, independently of the country in which they were type approved.

Base Station Subsystem (BSS)

The Base Station Subsystem (BSS) is composed of two main parts, the Base Transceiver Station (BTS) and the Base Station Controller (BSC). The BTS includes the radio transceivers that define the radio cell boundary and handles the radio (Um) interface protocols with the mobile station. There are a number of different cell types, macro, micro and pico, that can be deployed dependent on the terrain, subscriber density and coverage requirements. The macro cell is intended for large cell sizes with ranges from 2 km to 70 km. The micro cell is intended to provide cell sizes from 100 m to 5 km, either as an in fill or in areas serving a high density of subscribers. The pico cells are intended to support cell sizes in the range 50 m to 1 km and will be used to provide high quality local radio coverage. The BTS supports all the required channel coding, encryption and speech coding required by the radio interface. The speech transcoding may be performed locally at the BTS or remotely at the BSC or MSC. If remote transcoding is used, then the BTS is still required to control this function.

The Base Station Controller (BSC) manages the radio resources of one or more BTSs across the Abis interface. The BSC controls most of the features of the radio network, including allocation of radio time slots to a mobile station, release of the resources, interpretation of measurement results and control of radio interface hand-overs. The BSC interfaces to the NSS via the A-interface to the MSC.

Radio Transmission

The BTS is responsible for maintaining the radio link with the GSM Mobile station. Currently the GSM system can support three frequency bands at 900, 1800 and 1900 MHz. However in each band the physical TDMA structure is identical. Each RF carrier is divided into eight time slots using TDMA. Groups of eight consecutive time slots form TDMA frames.

There are two types of logical channels that are sent over the physical radio interface and these are Traffic channels and Common Control Channels. The traffic channels provide a bi-directional point-to-point transmission link to a mobile station. Full-rate Traffic Channels (TCH/F) and half-rate Traffic Channels (TCH/H) are allocated together with a low bit-rate Slow Associated Control Channel (SACCH), which typically transmits measurements needed for hand-over decisions. There are also eighth-rate Traffic Channels, also called Stand-alone Dedicated Control Channels (SDCCH), which are used primarily for transmitting location updating information. In addition, a TCH slot can be pre-emptied for signaling, in which case it is called a Fast Associated Control Channel (FACCH), which can be either full-rate or half-rate TCHs.

Common channels can be accessed both by idle mode mobiles, in order to change to dedicated mode, and by dedicated mode mobiles, to monitor surrounding base stations for hand-over information. The common channels, which are defined include:

Broadcast Control Channel (BCCH) Continually broadcasts, on the downlink, information including base station identity, frequency allocations, and frequency-hopping sequences.

Frequency Correction Channel (FCCH) and Synchronization Channel (SCH) Used to synchronize the mobile to the time slot structure of a cell by defining the beginning of a TDMA frame.

Random Access Channel (RACH)

Slotted Aloha channel used by the mobile to request access to the network.

Paging Channel (PCH)

Used to alert the mobile station of incoming call.

Access Grant Channel (AGCH)

Used to allocate an SDCCH to a mobile for signaling (in order to obtain a dedicated channel), following a request on the RACH.

Speech and Channel Coding on the Radio Interface

Speech in GSM is digitally coded at a rate of 13 kbps, so-called fill-rate speech coding. This rate is efficient compared with the standard ISDN rate of 64 kbps. In addition, GSM also supports a half-rate speech code operating at around 7 kbps, effectively doubling the capacity of a network.

This 13 kbps digital stream is split into (260 bits every 20 ms). This data contains some forward error correction raising the gross bit rate after channel coding to 22.8 kbps (or 456 bits every 20 ms). These 456 bits are divided into eight 57-bit blocks, and the result is interleaved amongst eight successive time slot bursts for protection against burst transmission errors.

Each time slot burst is 156.25 bits and contains two 57-bit blocks, and a 26-bit training sequence used for equalization. A burst is transmitted in 0.577 us for a total bit rate of 270.8 kbps, and is modulated using Gaussian Minimum Shift Keying (GMSK) onto a 200 kHz carrier frequency. The 26-bit training sequence (TSC) is of a known pattern that is compared with the received pattern to perform a channel estimation. This channel estimation is then used to recover the received signal. Forward error control and equalization contribute to the robustness of GSM radio signals against interference and multipath fading.

Network Subsystem

An essential component of the Network Subsystem is the Mobile services Switching Center (MSC). The MSC provides the functions required to switch calls to/from the mobile user and the PSTN or ISDN fixed network. In addition the MSC also provides the functions needed to track and maintain communication with a mobile subscriber, these include registration, authentication, location updating, inter-MSC hand-overs, and call routing to a roaming subscriber. In order to adequately maintain contact with the network subscribers the GSM PLMN employs a number of databases. The main database functions are provided by two Location Registers, known as the Home location Register (HLR) and Visitor Locations Register (VLR).

The Home Location Register (HLR) contains all the information related to an operators subscriber database. The HLR is the main database for a network. The HLR stores both static and dynamic data related to the subscriber. Static data includes items such as International Mobile Subscriber Identity, subscriber MSISDN number and registered supplementary services. Dynamic data includes, for example, current location of the mobile user, in terms of VLR and MSC E.164 Number, and call forwarding numbers. The HLR downloads the required data to a VLR database when a Mobile User registers in a VLR area, it also provides the necessary functionality to terminate mobile calls.

The Visitor Location Register (VLR) stores the subscribers data, downloaded from the HLR, for mobile stations currently located in the VLRs area. The data stored in the VLR may include information from the Home HLR and foreign HLRs. The VLR is used to provide both Mobile Originated and Mobile Terminated call functionality. The VLR is defined as an independent database in GSM, however in order to optimize system performance many implementations combine MSC and VLR functionality, this effectively makes the MSC and VLR areas identical.

The remaining two databases are associated with security aspects of the network. The Authentication Center (AUC) is a secure database used to provide authentication keys, based upon a secret key (ki), to the HLR and subsequently the VLR for verifying the validity of the users subscription. The algorithm (A3) used to perform the authentication of the subscriber is stored in the users Subscriber Identity Module card and Authentication Center (AUC), only the challenge and result are sent on the radio interface. The challenge is also used by another algorithm (A8) to generate the key required by the A5 radio interface encryption algorithm. Although GSM defines possible A3 & A8 algorithms they are more realistically defined by the operator. The remaining database is the Equipment Identity Register (EIR) which contains a list of valid International Mobile Equipment Identity (IMEI) values. The database can therefore be used to control the use of stolen, non-type approved or faulty mobile equipment. When a mobile subscriber registers with the network the IMEI can be obtained and validated against the EIR data. If the IMEI is blacklisted, then action can be taken to prevent network access by the user.

Operations and Maintenance

Associated with the BSS and NSS equipment are Operations and Maintenance Center, OMC-R and OMC-S, respectively. The OMC-R provides the operations and maintenance control of the GSM BSS functions. The OMC-R is used to perform the following functions:

Configuration of the Cells, this includes allocation of radio frequency, hand-over parameters, cell parameters and timer values.

Performance monitoring. This function allows the OMC-R to receive statistical information about the various aspects of the BSS, such as number of calls, numbers of hand-overs etc.

Alarm reporting. The OMC-R is used to view and handle various alarms that are originated by the BSS. These may include hardware or software failures, loss of connections, etc Software Download. The OMC-R is responsible for providing and updating the software load to the BSS.

The NSS equipment is associated with the OMC-S. The OMC-S provides the same type of high level functions as the OMC-R. In addition the OMC-S may be used to provide user data administration for the HLR and VLR. However this function is more usually provided by a dedicated Administration Center which can also deal with Billing Server requirements and SIM data.

Services Provided by GSM

GSM was designed with ISDN interoperability as a pre-requisite, consequently the services provided by GSM are a subset of standard ISDN services, however this is rapidly eroding as more ISDN services are developed within the GSM format. The GSM system provides a range of Basic and Supplementary Services. The Basic Services are further sub-divided into Teleservices and Bearer Services.

The Teleservices include:

Speech, the most basic service

Short Message, a two way messaging service

Group 3 FAX, this services allows connection to Group 3 FAX machines

Cell Broadcast, this service allows messages to be broadcast to the mobile stations.

The Bearer Services include:

Asynchronous Data 300–14400 bps, allows access to normal V-Series Modems

Synchronous Data 300–14400 bps, allows access to CSPDNs

PAD Services

Packet Services

The Supplementary Services are intended to enhance the functionality of the Basic Services. The Phase 1 specifications only provide Call Forwarding and Call Barring Services. The Phase 2 Supplementary services included Line identification services, advice of charge, multi-party, call waiting and call hold. The Phase 2+ services will include Call Transfer, Call Completion Busy Subscriber (CCBS) and Optimal routing capabilities independent as possible from the underlying specifics of the mobile network. Another sublayer is Supplementary Services, which manages the implementation of the various supplementary services, and also allows users to access and modify their service subscription. The final sublayer is the Short Message Service layer, which handles the routing and delivery of short messages, both from and to the mobile subscriber.

Problems with Clock Synchronization

In wireless systems, it is important to maintain frequency accuracy and network wide synchronization at BTSs. In the prior art, synchronization of BTSs has been achieved by either free-running accurate crystal oscillators or complex timing operations that determine and compensate for distances between the BSCs and attached BTSs. Both of these schemes present significant problems. In the case of the free-running oscillator, the maintenance costs and long term stability cause problems and in the case of BSC-BTS time measurement, the BSC and BTS need be from the same vendor and all the BTSs to be synchronized need to be attached to the same BSC. Consequently both of these schemes tend to be inadequate for large scale private systems which include indoor deployments. The use of conventional GPS receivers is not adequate since it is not always possible to receive the required GPS radio signals, particularly when indoors. Additionally, in those instances where the GPS source suddenly fails or disappears due to a failed antenna system or other system failures, it is necessary to reacquire the synchronization source through other means.

In accordance with the above background, it is an object of the present invention to provide wireless systems that facilitate reliable and accurate synchronization of clock signals using master clock signals from a global positioning system (GPS) or other accurate frequency source in a manner that facilitates both indoor and outdoor operations.

SUMMARY OF THE INVENTION

The present invention is used in a communication system that extends over a cellular region formed of a plurality of wireless cells where each cell covers a portion of the cellular region. Each cell has a base station a clock unit that facilitates reliable and accurate synchronization with other clocks units in other cells using a master clock signal from a global positioning system (GPS) or other accurate frequency source. The clock unit in each cell includes a local clock providing a local clock signal for clocking the cell. A master clock source provides one or more master clock signals and a clock synchronizer receives the master clock signals and forms a synchronizing master clock signal for synchronizing the local clock signal.

In one or more of the wireless cells of the communication system, the clock unit is a master clock unit which includes a clock distributor for distributing a distributed master clock signal to one or more other wireless cells having slave clock units. Typically, the master clock source includes a GPS receiver for receiving a GPS signal as a master clock signal. In another embodiment, the master clock source includes a high accuracy crystal controlled oscillator for generating an oscillator signal as a master clock signal.

In one embodiment, the base stations are connected together in a local area network that functions to help exchange clock signal information among the clock units.

The present invention is useful in a communication system formed by a private network that includes a private wireless network. The communication system also is useful in a public wireless network using a public wireless protocol, such as GSM, TDMA, or CDMA that is typically connected to other public networks, such as PSTN, ISDN and the Internet, using a wired protocol, such as IP. The private network also typically includes a local area network (LAN) and the private network typically connects to the public networks using a wired packet protocol, such as IP.

In connection with some embodiments, the public and private wireless networks operate with the same public wireless protocol, such as GSM or TDMA, and the private wireless network additionally operates with a wired packet protocol, such as IP.

The private wireless network uses private base stations (P-BTS) which include software for a wireless protocol, such as GSM or TDMA, include software for private network operation with a wired protocol, such as IP.

The communication system permits users to operate freely in both public and private wireless networks using standard mobile stations while achieving high private network data rates. The communication system typically uses normal wireless handsets or other mobile or fixed stations without need for any modifications.

The private base stations (P-BTS) in one embodiment are directly connected to a private LAN and thereby enable standard wireless stations to make and receive calls over the LAN. Also, the range of calls, using standard Internet protocols, extends between LANs and between different corporations over the Internet without requiring the support of a switch (e.g. MSC). The wireless stations can freely roam between the public wireless network and the private wireless network and a single telephone number can be assigned to a mobile station for use in both the public and the private wireless networks.

The foregoing and other objects, features and advantages of the invention will be apparent from the following detailed description in conjunction with the drawings.

DETAILED DESCRIPTION

Figure 1:
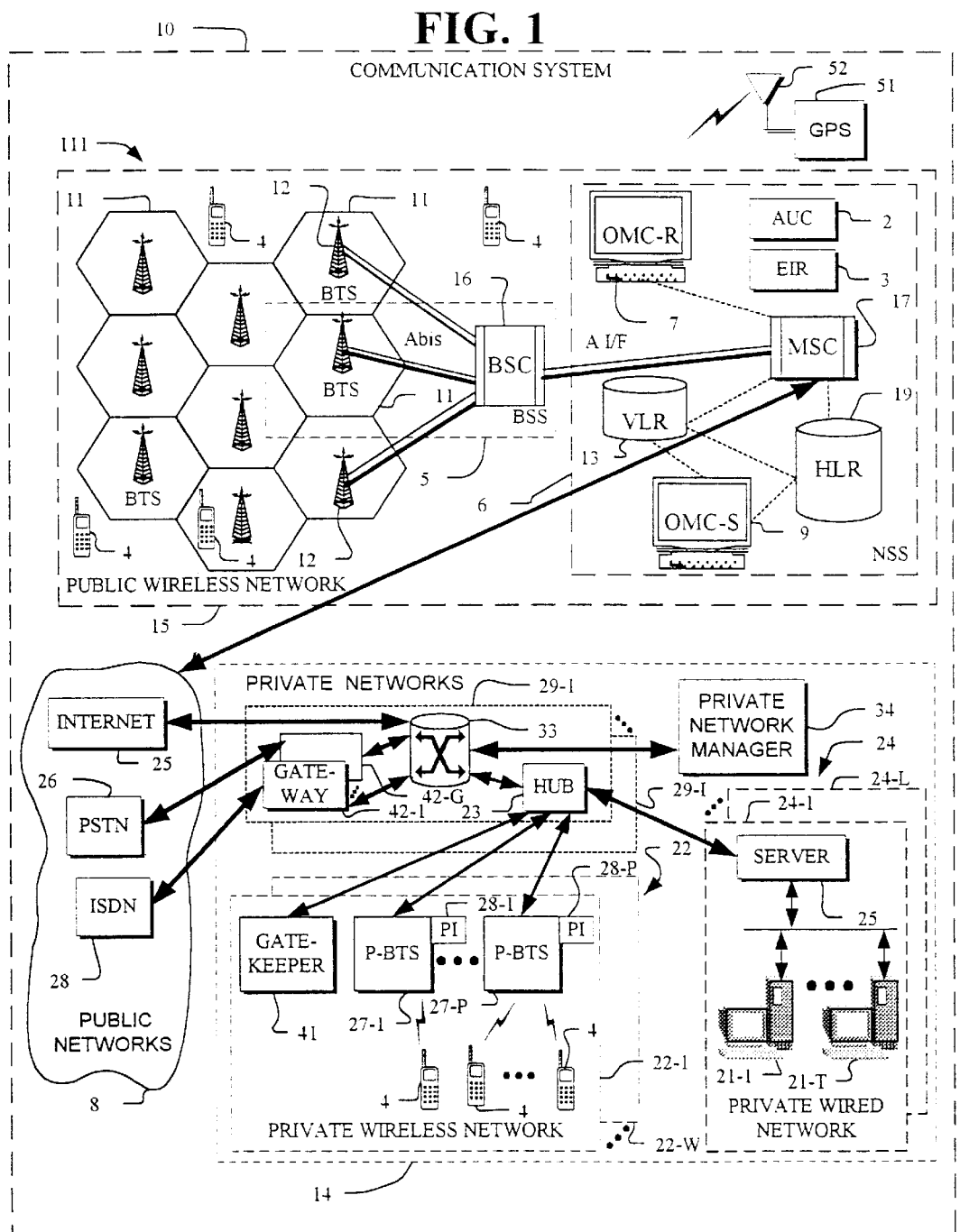
FIG. 1 is a block diagram representation of a communication system including a public wireless network, other public networks such as PSTN, ISDN and the Internet and including a private network.

Communication System—FIG. 1

In FIG. 1, the communication system 10 includes a conventional public wireless network 15, conventional public networks 8 (such as PSTN, ISDN and the Internet) and private networks 14. The public wireless network 15 includes the ability to communicate in a conventional manner with conventional wireless mobile stations 4. The private network 14 functions to communicate with the conventional mobile stations 4 and provides additional private network capabilities not provided by the conventional public wireless network 15.

The public wireless network 15 and the private wireless network 22 have a need for time synchronization and accurate clocks provided, for example, by a global positioning system (GPS) signal from one of the GPS transmitters 51. Other accurate frequency sources can also be used to establish a master clock signal.

The conventional public wireless network 15 of FIG. 1 includes the mobile stations (MS) 4, Base Station Sub-System (BSS) 5 and the Network Sub-System (NSS) 6. The Base Station Subsystem (BSS) 5 is composed of the Base Transceiver Stations (BTSs) 12 and the Base Station Controller (BSC) 16. Each of the BTSs 12 includes a radio transceiver that defines the radio boundary of a cell 11 and handles the radio (Um) interface protocols with the mobile stations 4.

The cells 11 in the wireless public network 15 of FIG. 1 each exist over a different area and together the cells 11 collectively exist over a larger area designated as a region 111. Each cell 11 in the region 111 uses frequencies that are isolated from the frequencies of other cells in the region. When mobile stations 4 travel from one of the cells 11 to another one of the cells 11, a frequency hand-over occurs.

The private networks 14 of FIG. 1 also include private base stations (P-BTS) 27 within the private wireless networks 22 for communications with mobile stations 4 located within the domain of the private networks. The cells within the domain of the private networks 14 of FIG. 1 are also within the range of one or more of the cells 11 of the public wireless network 15 of FIG. 1. Typically, the allocation of frequency spectrum in different public or private regions is under governmental control and frequency spectrum is allocated to different entities in different regions or different countries. The owner of the rights to particular frequencies in a region including public wireless network 15 and private wireless networks 22 controls the allocation of frequencies among public cells 11 and the private cells 411 (see FIG. 3).

The Base Station Controller (BSC) 16 manages the radio resources of one or more BTSs across an Abis interface. The BSC 16 controls the radio network, including allocation of radio time slots and frequencies to mobile stations 4, release of resources, interpretation of measurement results and control of radio interface hand-overs. The BSC 16 interfaces to the NSS 6 via an A-interface to MSC 17. The Network Subsystem (NSS) 6 includes the Mobile services Switching Center (MSC) 17 that provides the functions required to switch calls to/from the mobile stations 4 and the fixed public networks 8 (including PSTN and ISDN). In addition, the MSC 17 also provides the functions needed to track and maintain communication with mobile stations 4 and these include registration, authentication, location updating, inter-MSC hand-overs, and call routing to roaming mobile stations 4. The GSM/TDMA/CDMA cellular system employs a Home Location Register (HLR) 19 and a Visitor Location Register (VLR) 13, an Authentication Center (AUC) secure database 2 and an Equipment Identity Register (EIR) 3. The Operations and Maintenance Center includes the OMC-R 7 and the OMC-S 9.

In FIG. 1, private networks 14 include the private wireless networks 22 (including private wireless networks 22-1, ..., 22-W), private wired networks 24 (including local area networks, LANs, 24-1, ..., 24-L), and connection units 29 (including connection units 29-1, ..., 29-1). The private network 14 can include wide area networks (WAN) and any other type of network presently or hereafter available. The connection unit 29 includes a hub 23 for interconnecting the private wireless networks 22 and the LANs 24 and for connecting the private network 14 to the public networks 8. The hub 23 connects to the router 33 that directs calls among the public network facilities including the ISDN 28, ..., PSTN 26 and the Internet 25 and the private network 14. The private network 14 uses the same protocol as the Internet 25 and connects directly without need for a separate gateway. The connection unit 29 includes gateways 42-1, 42-2, ..., 42-G for connecting the ISDN 28 and the PSTN 26 which use different protocols than the private networks 14.

In FIG. 1, the private wireless networks 22 include the wireless capabilities of the public wireless network 15 of FIG. 1. In addition, the private wireless network 14 is suitable for operating with advanced technologies that are not generally available publically. Current advanced technologies operate with rates of 384 kb/s and are approaching rates of 2 Mb/s for W-CDMA. In FIG. 1, wireless communications between the public BTSs 12 and mobile stations 4 operate with a wireless protocol such as GSM/TDMA/CDMA. In FIG. 1, wireless communications between the private P-BTSs 27 and mobile stations 4 for convenience and compatibility operate with the same wireless protocol (such as GSM/TDMA/CDMA) as used by the public BTSs 12 in the public wireless network 15.

In FIG. 1, the local area networks (LANs) 24 are private wired networks operating with a wired packet protocol such as IP. LAN 24-1 is typical and includes, for example, a server 25 and LAN terminals 21 (including terminals 21-1, ..., 21-T). Terminals 21-1, ..., 21-T communicate with each other and with the public networks 8 through connection unit 29-1 using the wired packet protocol.

In FIG. 1, the P-BTSs 27-1, ..., 27-P are associated with protocol converters 28-1, ..., 28-P, respectively, that connect P-BTSs 27-1, ..., 27-P to connection unit 23 using the private network protocol used by the LANs 24 and the connection unit 23. Therefore, the mobile stations 4 communicating through the P-BTSs 27 in the private networks 14 have access to the terminals 21 in LANs 24 and have access to the public networks 8. Further, the P-BTSs 27 in the private wireless networks 14 have available higher data rates than those available through the BTSs 12 in the public wireless network 15. In the example described in the present specification, private rates up to 384 kbps or higher are possible whereas conventional public cellular networks currently only provide rates up to 64 kbps. Accordingly, data retrieval operations in the private networks 14 are better accommodated than in the public wireless network 15 of FIG. 1.

In FIG. 1, the wireless P-BTS 27 directly connect the mobile stations 4 through connection unit 23 to other facilities in private networks 14 and thereby permit, for example, the mobile stations 4 to send and receive calls to and from the terminals 21 in the LAN networks 24. Furthermore, the range of calls from and to mobile stations 4 in the private wireless network 22, using standard Internet protocols (IP), extends over the Internet in public networks 8 to any Internet facility such as different LANs and different corporations in different regions or countries.

The private wireless networks 22 in FIG. 1 do not require the internal support of a circuit switch from the public networks and therefore, the private networks 14 in the FIG. 1 system can easily grow to accommodate new user requirements under control of the owners of the private networks 14.

In the private networks 14 of FIG. 1, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 1 without restriction. Because of this free movement capability, only a single number is required for each mobile station 4 for both private wireless network communications and for public wireless network communications.

The private wireless networks 22 of FIG. 1 have P-BTSs 27-1, ..., 27-P which correspond to P cells in the private wireless domain. The allocation of frequencies among the public wireless network cells and the private network cells is determined by agreement of the owners of the public wireless network 15 and the private networks 14.

Figure 2:
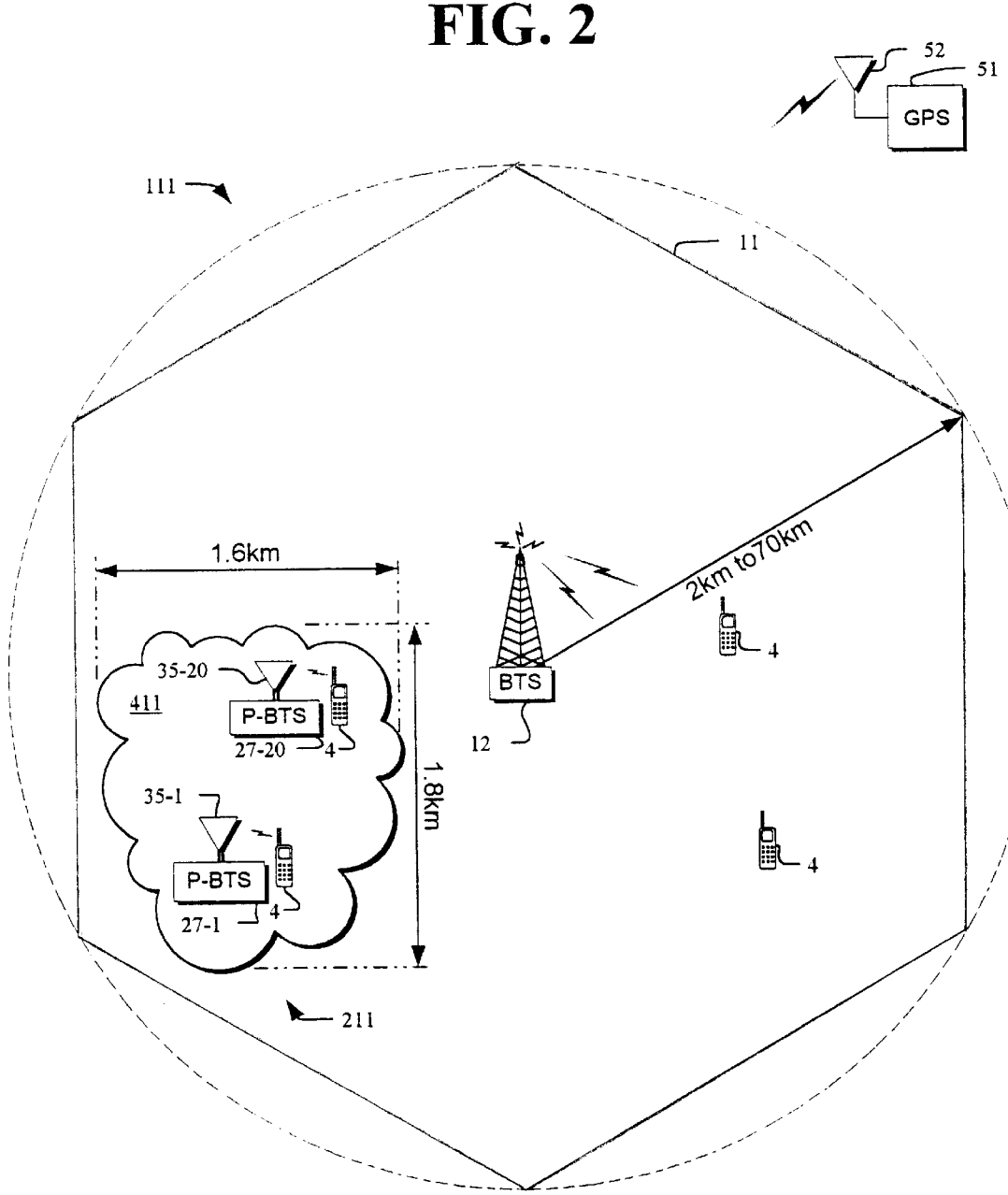
FIG. 2 depicts a private wireless region within a cell of a public wireless region.

Private and Public Overlapping Regions—FIG. 2

FIG. 2 depicts a private wireless region 211 within a cell 11 of a public wireless region 111. The private wireless region 211 is formed by a group of private cells 411 that cover an area of approximately 1.6 km by 1.8 km in the cell 11 of the public wireless network region 111. The cell 11 of the public wireless network region 111 typically covers a range defined by a radius of from 2 km to 70 km. Although region 211 is shown in FIG. 2 as being entirely within a single cell 11, region 211 can fall within multiple cells of the public wireless network region 111 of FIG. 1. The allocation of frequency spectrum among the cells 11 in the public wireless network region 111 and the cells 411 in the private wireless network region 211 must be implemented so as not to create unacceptable interference among the public and private cells. The users 4 in FIG. 2 typically are free to move any where in the public wireless network region 111 for connection using the frequencies of the public wireless network and are free to move any where in the private wireless network region 211 for connection using the frequencies of the private wireless network. The regions 111 and 211 in FIG. 2 are within the range of a GPS signal form one or more GPS transmitters 51.

Figure 3:
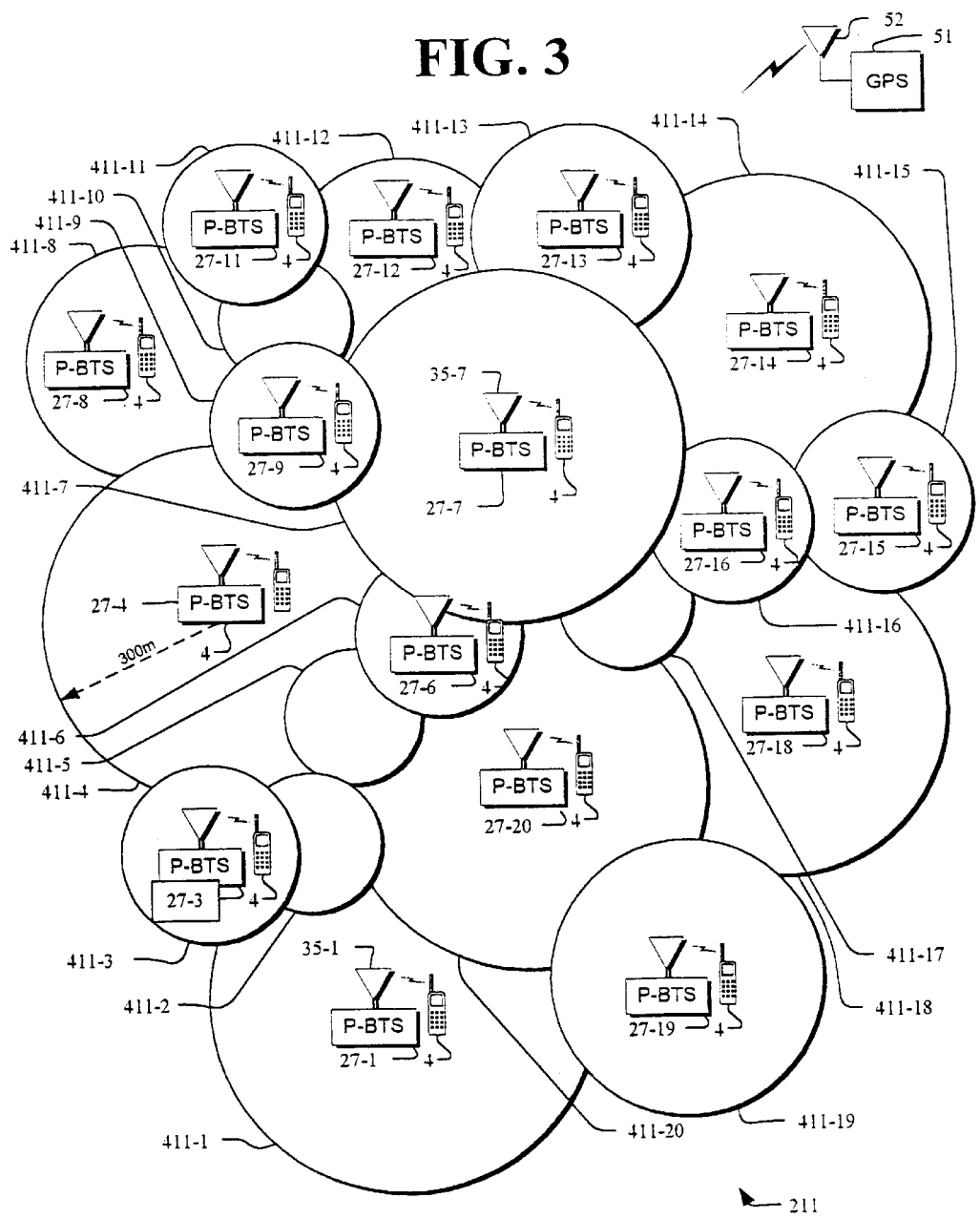
FIG. 3 depicts a representation of the cells forming the private wireless region of FIG. 2.

Private Region—FIG. 3

In FIG. 3, the private region 211 of FIG. 2 is shown in further detail. The private region 211 includes a number of private cells 411, including the cells 411-1, . . . , 411-20. Each of the private cells 411 is like one of the public cells 11 in the public wireless network 15 of FIG. 1 although the private cells 411 generally cover smaller areas than the public cells 11. The cells 411-1, . . . , 411-20 have the corresponding private base stations (P-BTSs) 27-1, . . . , 27-20. The users 4 of FIG. 3 are free to move to any of the private cells 411-1, . . . , 411-20 of FIG. 3 or to any of the cells 11 in the public wireless network of FIG. 1. When a user 4 moves from one cell to another, whether public or private, an appropriate hand-over occurs. The region 211 in FIG. 3 is generally within the range of the GPS signal from the GPS transmitters 51. In operation, however, frequently one or more of the P-BTSs 27 is located indoors or otherwise so as not to adequately receive a GPS signal. For example, it is assumed for purposes of explanation that only P-BTS 27-7 and P-BTS 27-1 receive and use a GPS signal. In the assumed example, P-BTS 27-7 acts as the master clock distributor for the slave P-BTSs 27-12, . . . , 27-16 and the P-BTS 27-1 acts as the master clock distributor for the slave P-BTSs 27-2, . . . , 27-6.

Figure 4:
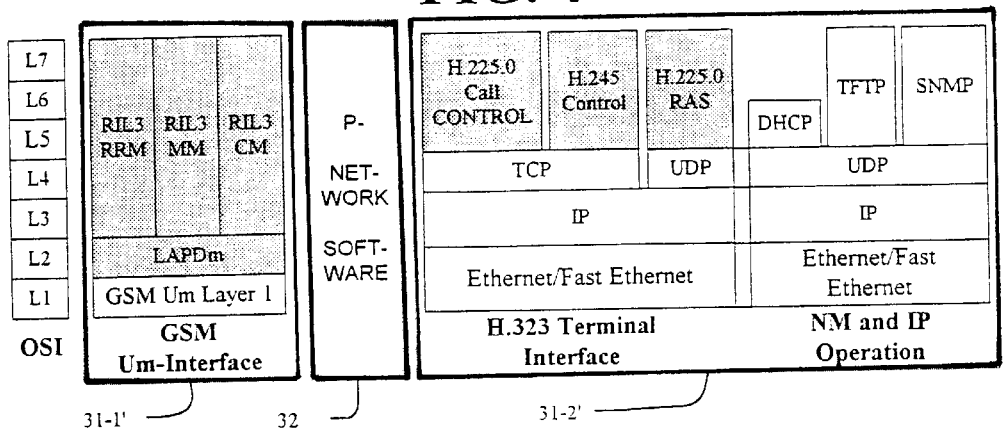
FIG. 4 depicts primary interface protocol stacks for IP-based private wireless base stations (P-BTS).

Protocol Stacks for Signaling—FIG. 4

To support the architecture of FIG. 1, FIG, 2 and FIG. 3 in a GSM embodiment, a standard GSM/TDMA stack 31 including the GSM Um-Interface component 31-1' and the H.323 Terminal Interface and NM and IP Operation components 31-2' is used together with the P-Network Software 32. The stack of FIG. 4 operates for a LAN connected example of P-BTSs 27 to control the inter-working between the two Call Control Functions—(private wireless and LAN) and the private wireless mobility management (including the Call Processing Plane Software Modules).

In a GSM example, the FIG. 1 public wireless network 15 includes conventional GSM base station software including the components analogous to components 31-1' and 31-2' of FIG. 4. The conventional software including the components 31-1' and 31-2' do not provide support for call control or connection to the private wired internet protocol (IP) that is used, in certain embodiments, in the private networks 14 of FIG. 1. Accordingly, the software components 31-1' and 31-2' require an IP protocol interface to facilitate inter-operation of the wireless protocol and the wired packet protocol. For convenience, the IP protocol interfaces 28-1, . . . , 28-P are located with the P-BTSs 27-1, . . . , 27-P in the private wireless network 14 of FIG. 1. The present invention can be employed for public wireless networks 15 and for private wireless networks 14 of FIG. 1. The private wireless networks may or may not include the ability to communicate with private wired networks 24. The P-Network Software 32 is configured to provide the services required for any particular configuration.

In one configuration, each P-BTS 27 contains the required protocol stacks to perform the functions of the wireless control signaling from the mobile station 4 and the H.323 Endpoint, gatekeeper 41 or gateway 42-1 of FIG. 1. In this embodiment, the H.323 Endpoint can be a PC based terminal 21 (see FIG. 1) or another mobile station 4. The gatekeeper provides the functions necessary to control the "terminals" within the H.323 domain and, in this embodiment, "terminals" include GSM mobile stations 4.

The H.323 gatekeeper provides the functions required to register the mobile stations 4 (equivalent to Location Updating), permit access to the network, translation of called numbers and routing of calls, if required. These functions are largely equivalent to those normally found in the MSC 17 or HLR 19 (see FIG. 1) of a public wireless network 15. The gatekeeper functions only need to exist in one P-BTS of the P-BTS 27-1, . . . , P-BTS 27-P within the H.323 zone.

In order to support the full range of wireless functions, the functions of a standard H.323 gatekeeper are augmented. The design includes the addition of a Local User Database (LUDB) to control the mobile station and provide Supplementary Services (SS) functionality. The gatekeeper database contents are transferred to the serving P-BTS when the mobile station 4 registers (that is, Location Updating has taken place) on a P-BTS. For example, if a mobile station 4 has registered on P-BTS 27-1 in FIG. 1 and the user data of mobile station 4 is stored with the gatekeeper 41 supported by some other P-BTS, then the relevant contents of the user database in that other P-BTS are transferred to P-BTS 27-1 when the registration takes place. Any updates or alterations to the data by interaction of mobile station 4 are reflected back to the main gatekeeper database modules stored in the gatekeeper 41. This approach reduces the amount of call control signaling that is required within a LAN interconnection of P-BTS 27-1, . . . , 27-P and provides redundancy for increased reliability.

In order to provide external PSTN or public wireless network interconnection, an H.323 gateway 42 is provided. The gateway 42 is part of the normal LAN-PSTN operation. The gateway 42 provides line interface and transcoding functions that allow the voice and data traffic to be sent to existing networks (for example, PSTN, ISDN, B-ISDN, PBX).

An additional function required of a P-BTS 27 when used in a LAN environment is the ability to control the hand-over of mobile stations 4 between different P-BTSs 27 as mobile stations 4 move around within the LAN zone serviced by the private networks 14 of FIG. 1. The hand-over decision is made internally within each P-BTS 27, only the signaling necessary to command a hand-over needs to go between different ones of the P-BTSs 27.

Figure 5:
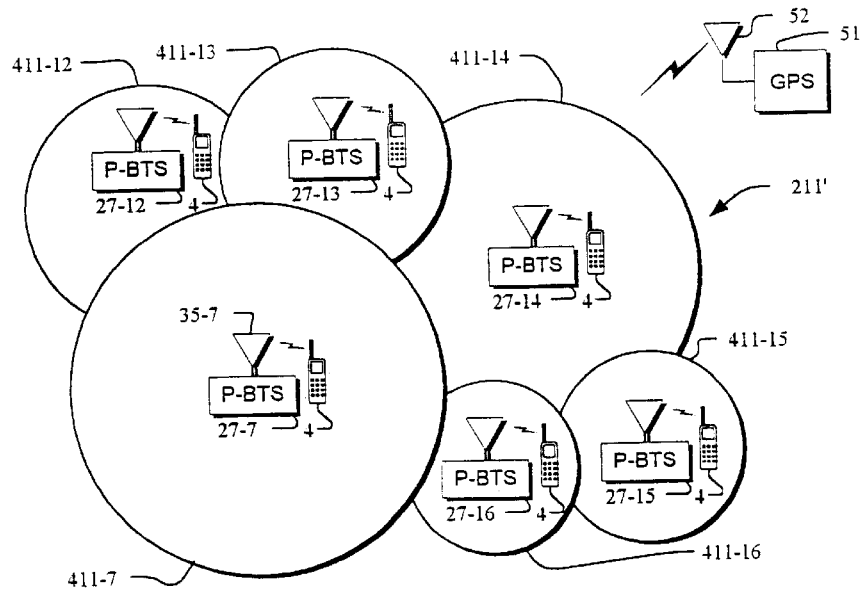
FIG. 5 depicts a group of the cells of FIG. 2 clocked by a common master clock.

Portion of Private Region—FIG. 5

In FIG. 5, a portion 21 1' of the private region 211 of FIG. 3 is shown including a number of the private cells 411 and specifically the private cells 411-7, 411-12, . . . , 411-16. The cells 411-7, 411-12, . . . , 411-16 have the corresponding private base stations (P-BTSs) 27-7, 27-12, . . . , 27-16. When users 4 move among the cells 411-7, 411-12, . . . , 411-16 of FIG. 5, hand-overs from P-BTS to P-BTS occur. In order for the various P-BTS to operate together and so as not to interfere with each others operation, accurate clock frequencies are required at each P-BTS. In the FIG. 5 example, the GPS source 51 provides an accurate timing signal to the region 211' by broadcasting a GPS signal through transmitter antenna 52. For purposes of explanation, it is assumed in FIG. 5 that only the P-BTS 27-7 receives and uses the GPS signal and that the other P-BTSs 27-12, . . . , 27-16 do not use the GPS signal for the reason that the GPS signal is too weak, that the P-BTSs 27-12, . . . , 27-16 do not have GPS receivers or that some other reason exists. In this example, the P-BTSs 27-12, . . . , 27-16 operate as slaves and the P-BTS 27-7 operates as a master using the GPS signal to calibrate a distributed master clock signal.

Figure 6:
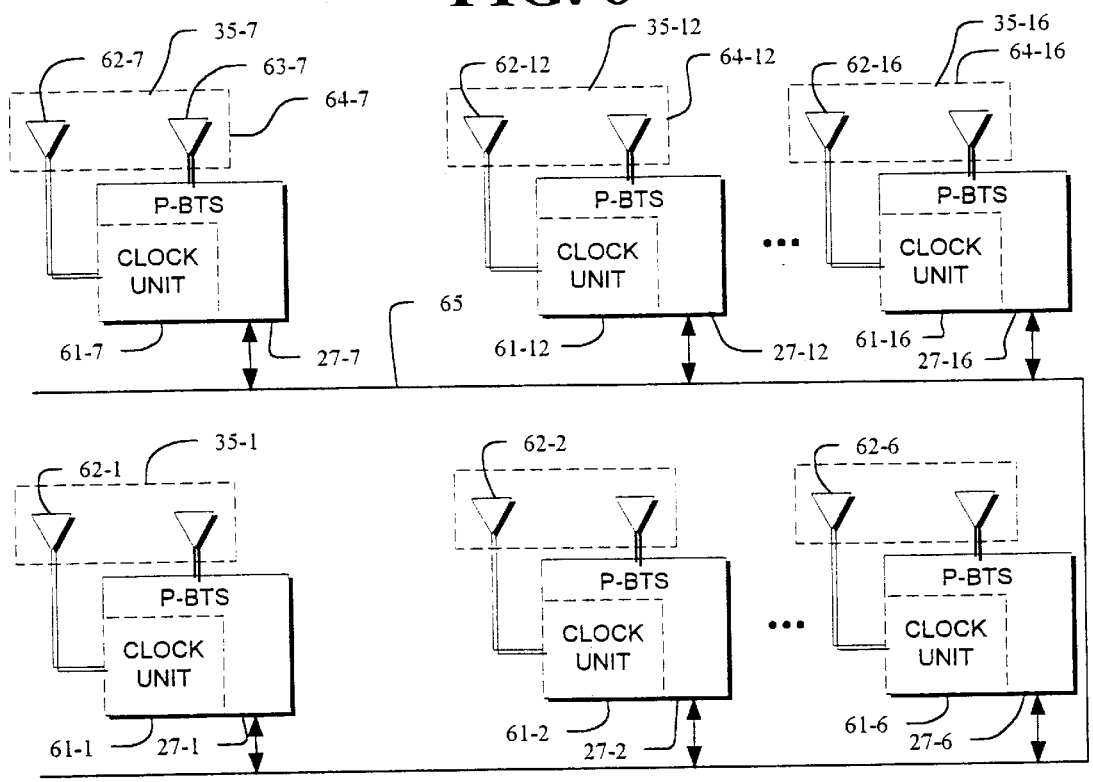
FIG. 6 depicts the private wireless P-BTS and the associated clock units.

Master/Slave Clock Units—FIG. 6

In the FIG. 6, a plurality of the P-BTSs 27 from the region 211 in FIG. 3 are shown. Particularly, the P-BTSs 27-7 and 27-12, . . . , 27-16 corresponded to the P-BTS in region 21' of FIG. 5. In FIG. 6, the P-BTSs 27 operate with P-BTS 27-7 as the master base station where the clock unit 61-7 functions as the master clock. The antenna 62-7 for clock unit 61-7 receives the global positioning system (GPS) signal from a GPS transmitter 51 of FIG. 5. The clock units 61-12, . . . , 61-16 function as slave clock units and are synchronized by the master clock unit 61-7. In FIG. 6, the P-BTSs 27-1 and the P-BTSs 27-2, . . . , 27-6 correspond to a different region in the FIG. 3. The clock unit 61-1 in base station 27-1 functions as the master clock unit. The clock units 61-2, . . . , 61-6 function as the slave clock units which are synchronized by the master clock unit 61-1. The P-BTSs 27 in FIG. 6 are interconnected by the connection 65 that forms a local area network (LAN).

Figure 7:
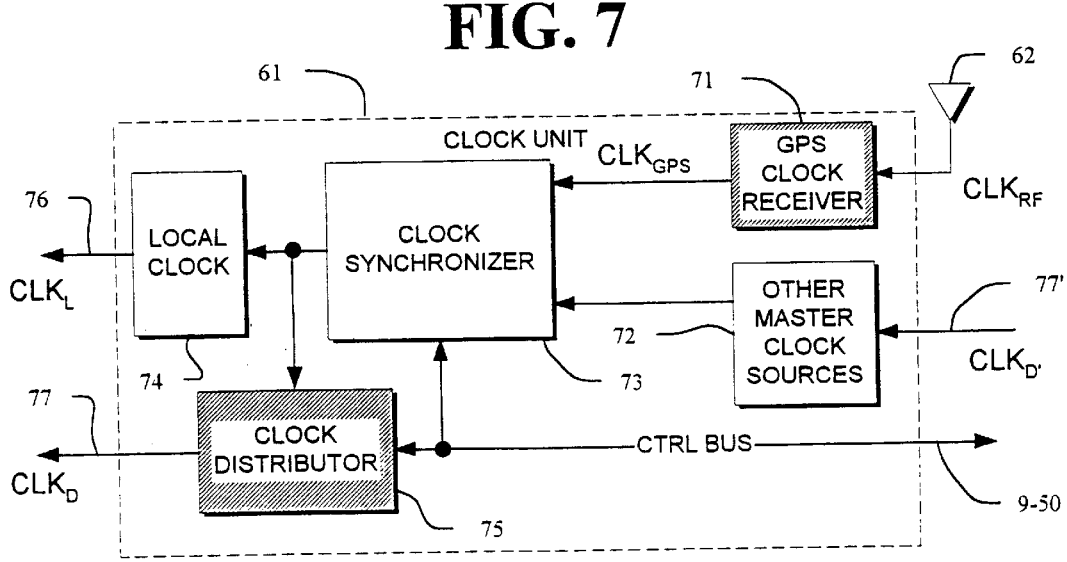
FIG. 7 depicts a block diagram representation of a typical clock unit of a P-BTS.

Clock Unit Detail—FIG. 7

In the FIG. 7, clock unit 61 is typical of the clock units 61-7 and 61-12, . . . , 61-16 and the clock units 61-1 and 61-2, . . . , 61-6 in FIG. 6. The clock unit 61 of FIG. 7 functions either as a master or as a slave depending on the role described in connection with FIG. 6. The clock unit 61 includes a global positioning system (GPS) signal, $CLK_{GPS}$ receiver 71 which has antenna 62 for receiving the GPS signal. At times, the GPS signal functions as the master clock synchronization signal. Other master clock signal sources 72, including a distributed master clock signal, $CLK_D$, on line 77 from some other clock unit acting as a master clock unit, also provide master clock signals. The master clock sources used to provide the master clock can be derived from a GPS signal, from a very high stability crystal, from a line interface, from an atomic clock or from some external BTS not part of the domain shown in FIG. 5. Further, the master clock source can be a frequency analyzer that can be used as a fall back should other master clock sources fail. The master clock signal sources 71 and 72 connect as inputs to the clock synchronizer 73. The clock synchronizer 73 functions to select (or combine) the received master clock signals to provide a synchronized master clock signal to the local clock 74 and to the clock distributor 75. Local clock 74 functions to provide a local clock signal, $CLK_L$, on line 76 for clocking the local P-BTS. The clock distributor 75 receives the synchronized master clock signal from the clock synchronizer 73 and, when operating as a master clock, distributes a distributed master clock signal, $CLK_D$, on line 77 to other clock units which receive a distributed master clock signal, $CLK_{D'}$, on an input like line 77' (analogous to the output on line 77 except for another clock unit) in FIG. 7. When the clock unit 61 of FIG. 7 functions only as a slave, the GPS clock receiver 71 and the clock distributor 75 may be eliminated.

The clock synchronizer 73 and the clock distributor 75 connect via control bus 9-50 to the P-BTS processor 9-30 (see FIG. 9) and are controlled by, or are implemented as part of, the control algorithms executing in processor 9-30.

Figure 8:
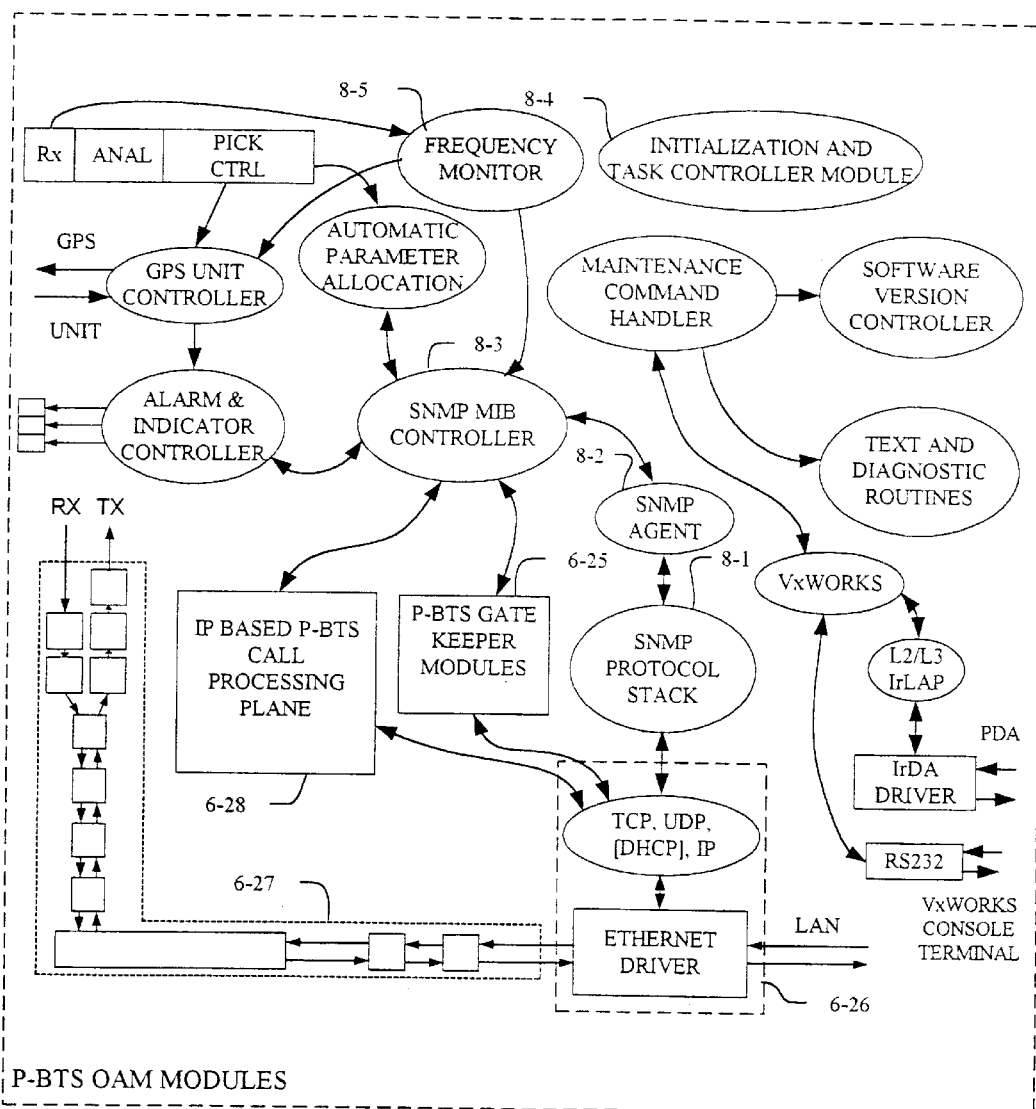
FIG. 8 depicts IP-Based private wireless P-BTS OAM Software Modules.

IP-Based P-BTS OAM Software Modules—FIG. 8

The OAM Software Modules for the IP-Based P-BTS uses an SNMP based Management Information Base (MIB). The new modules beyond those found in a normal public BTS are as follows:

SNMP Protocol Stack Module—The module 8-1 is the SNMP protocol stack as used to control the SNMP MIB.

SNMP Agent—The module 8-2 provides the agent side code to perform the action request from the SNMP manager via the SNMP protocol.

SNMP MIB Controller Module—The module 8-3 is responsible for maintaining the SNMP MIB (a logical view, from maintenance perspective, for all the resources) for the P-BTS. The remote OAM commands from, for example an OMC-R are all carried out via changes to the MIB. The MIB controller than interprets the changes and performs the maintenance actions. Alarm and Performance reports from the P-BTS will also be collected and stored in the MIB. This module handles all the SNMP MIB, including additional configuration and controlling attributes for the H.323 aspects of the P-BTS. Furthermore, the CC and MM functionality and RR functionality is also managed by this module.

Initialization and Task Control Module—The module 8-4 is responsible for handling the initialization of all the other Software Modules, establishing communication, and monitoring the health of all these processes through heart-beat (keep-alive timer) mechanisms.

Frequency Monitor—The module 8-5 monitors and controls the clock frequencies used for synchronizing P-BTS.

Clock Operations.

The GSM base station radio operates such that the SCH and BCCH channels are utilized for BTS synchronization purposes using an accurate frequency source tightly coupled with the GSM radio in a master unit.

The system operates to synchronize slave wireless P-BTS units to a master wireless P-BTS unit that uses an accurate clock source In order to provide synchronization, a master P-BTS unit uses a master clock source to condition its internal clocks and set the frequency standards and a slave P-BTS unit uses the master timing through a distributed master clock signal from the master P-BTS. In operation, a slave P-BTS determines which RF BCCH frequency belongs to a master P-BTS.

The master P-BTS unit, for example, receives a GPS signal from 1 to 12 GPS satellites of the GPS transmitters 51. These signals are used to condition the timing sources used by the master P-BTS. The master P-BTS uses the conditioned clock source to generate the timing references for its RF circuitry, and therefore the signal transmitted by the master P-BTS uses a highly accurate master clock. In addition, the master P-BTS may also set data bits that are transmitted on the RF BCCH carrier to indicate that this RF signal is derived from a very accurate clock source. In the case of a GSM system, for example, the data bits used are derived from the System Information fields regularly transmitted on the Broadcast Control Channel (BCCH).

The slave P-BTS unit selects the transmissions from the master P-BTS unit. In this scheme, the control logic within the slave P-BTS tunes into a range of RF signals carrying the BCCH of a master P-BTS. The selection of the BCCH RF carrier is performed in a number of ways. In one embodiment, the slave P-BTS wishing to synchronize to the master P-BTS scans the range of possible BCCH radio frequency carriers. As each RF carrier is detected, it is demodulated to recover the data necessary to determine if the received signal is from a master P-BTS unit. The master unit transmits an identification message in the BCCH data stream. Once a master BCCH RF carrier has been detected, the slave P-BTS can measure the received power and determine if this is a suitable signal to use. If the received RF power is too low, it may be difficult to maintain the necessary reception to provide good quality clock recovery. If the received signal strength is suitable, then the receiver is left tuned to that BCCH RF carrier and the clock recovered from the signal.

If slave P-BTSs are connected to the master P-BTS by a LAN network, the master P-BTSs informs the slave P-BTSs over the LAN as to which frequencies are being used by the master P-BTS. Using the LAN connection, the acquisition of the master P-BTS RF signal is much faster and more accurate than if the slave P-BTSs are required to scan the full range of possible BCCH radio frequency carriers. The slave P-BTS unit connected by a LAN scans a limited range of BCCH RF carriers to determine the best signal strength. Furthermore, once the master signal has been identified, it is possible to request the power level at which the signal is being transmitted from the master P-BTS unit, via the interconnecting LAN network. Given the Received Signal Strength and the transmitted power, the distance between the two units is approximated using well known RF propagation formulae. Using this distance, correction factors are added for determining the time delay between the two units and for recovering other signal information such as frame synchronization data.

Clock Recovery Process

In a GSM example, the required clock signal is recovered from the Synchronization Channel (SCH) transmitted on the BCCH RF carrier. The SCH burst uses a pattern of bits that provides an offset frequency from the main RF carrier signal such that the carrier can be filtered out and the clock signal recovered. Also, as both the master and slave P-BTSs are stationary, it is possible to ignore doppler shift of the radio and other problems such as fading. The recovered clock signal is then used to condition the local clock which typically includes an onboard crystal in the slave P-BTS. The onboard crystal source used in the slave P-BTS has inherent short term stability, but is likely to drift over time with ageing, temperature fluctuations and changes in supply voltage. Therefore, the recovered clock signal, nominally at 13 Mhz (any accurate derived frequency can be used) is applied to a microprocessor controlled comparator. The comparator compares the crystal output and the received signal from the BCCH RF carrier. The comparison takes into account any multipath (the signal could be received via a reflective surface) problems by long term averaging of the received RF signal. Also, the comparison between the crystal output and received RF signal over a long time period is done in order to average out any very short term fluctuations in the crystal output. Once a sufficiently large difference has been detected between the crystal output and the received frequency signal action is taken to adjust the crystal output. This operation brings the crystal back into the required operational settings over a period of time that typically is a few hours or days. The speed with which the crystal is brought back into specification depends on how far the output has drifted from the required specification.

Redundancy

If a master P-BTS synchronization source suddenly fails, then the slave P-BTS must reacquire a new synchronization source within a period of time. The exact period of time will depend on several factors such as the type of crystal used in the slave P-BTS and the setting of the crystal clock when the reference source was lost. The acquisition of a new reference source can be performed as described above for synchronizing the local clock with the received clock signal derived from the RF signal. In this case, typically the slave P-BTS continually hunts for new master P-BTS sources while operational (the hunting process occupies a short period of time compared with the time required to set the crystal output). This operation allows the slave P-BTS to immediately jump to a new master BCCH RF carrier as soon as the current master P-BTS is lost. Of course this information can also be supplied via maintenance clock information connected over a LAN to each of the slave P-BTS units. In this case upon failure, the P-BTS immediately switches its synchronization reference to an alternate BCCH source as has benn identified over the LAN.

Synchronization Redundancy

GPS interface to OAM. Each radio interfaces to the Network Management System via a standard SNMP interface across the network. It is through this interface that the GPS synchronisation card communicates with the OAM system, informing it of its condition, current synchronisation reference, and request for synchronisation reclassification. This scheme is also used to set up slave units and indicate all the possible master P-BTS units that could be used to potentially synchronise their crystal source.

Maximum SCH rebroadcast hops. Each slave P-BTS unit may only "listen" to a GPS synchronised reference. A slave P-BTS accepting a rebroadcast GPS source may not broadcast signals on the BCCH indicating it is a master P-BTS synchronising source. This should prevent "a copy of a copy" from being used. If a slave unit was used to synchronise a slave unit then it is likely that the frequency errors would accumulate meaning that the receiving slave may incorrectly set its crystal frequency out of specification.

System configuration and guidelines. Each P-BTS can be individually configured to acquire synchronization from a preferred source. Normally, each P-BTS may be presented with multiple master clock sources that include network card references (E1/T1, xDSL, ISDN), primary port, secondary port, internal oscillator, GPS reference, SCH reference and 10/100BaseT reference.

The system administrator can rank order these master clock sources in priority. This priority scheme must also be configured to explicitly define the number of times the P-BTS can move to another synchronisation reference within a specified period of time, reporting this to the centralized network management system. This prevents the system from looping through endlessly should a series of deficient sources impact the network.

Figure 9:
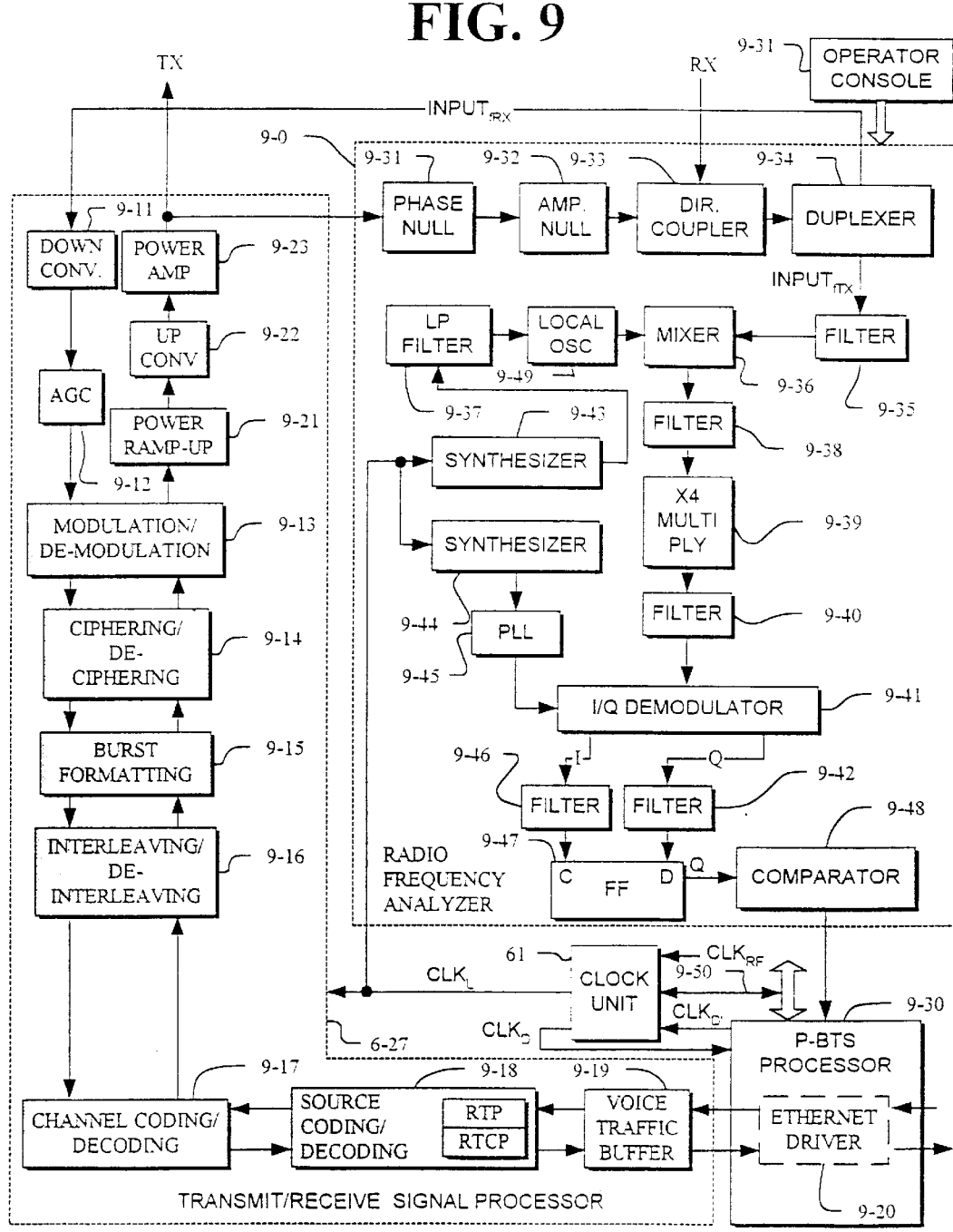
FIG. 9 depicts a block diagram representation of a transmit/receive signal processor, a radio frequency analyzer, an Ethernet driver and a P-BTS processor employed in the private wireless base stations (P-BTS).

Signal Processor and Radio Frequency Analyzer—FIG. 9

FIG. 9 is a block diagram representation of a transmit/receive signal processor 6-27, a radio frequency analyzer 9-0, Ethernet driver 9-20 and a P-BTS processor 9-30 employed in the private wireless base stations (P-BTS) 27 of FIG. 1, FIG. 2 and FIG. 3.

The radio frequency analyzer 9-0 receives both the signal (RX) from the receive antennas and the signal (TX) from the transmitter output of the signal processor 6-27. The transmitter output (TX) is fed to the phase null circuit 9-31 and amplitude null circuit 9-32 to prevent feedback from the transmitted signal (TX) into the frequency analyzer 9-0 which is set to receive in the transmit band. A directional coupler 9-33 feeds the nulled transmit signal and the received signal (RX) into a bandpass duplexer 9-34. The duplexer 9-34 provides the received signal, transmitted by some other P-BTS, with the local transmitted signal TX removed, and that signal is sent to the receiver signal processor 6-27 at the receive band frequency ($INPUT_{fRX}$) and that signal is provided for use in the frequency analyzer 9-0 at the transmit band frequency ($INPUT_{fTX}$). The received signal used in the frequency analyzer 9-0 is further filtered and amplified in active filter 9-35 before being fed into mixer 9-36. The mixing frequency supplied to the mixer 9-36 is set by the digitally controlled synthesizer 9-43 and is low pass filtered in filter 9-37 to control a local oscillator circuit 9-49 driving the mixer 9-36. The synthesizer 9-43 selects, via software control of software executing in processor 9-30, the input frequency to be used in the frequency analyzer 9-0. The IF frequency produced by the mixing operation of mixer 9-36 is then multiplied by four in multiplier 9-39 and the output is further filtered to achieve a clean signal to be input to the I/Q demodulator 9-41. The I/Q demodulator 9-41 is fed via a local phase-locked-loop (PLL) oscillator 9-45, running at 4 times the IF frequency, which in turn is controlled via a frequency synthesizer 9-44. Synthesizer 9-44 uses the clock signal, $CLK_L$, to be measured as the source frequency for the synthesizer where, in one example, a 13 MHz clock, is used. However, other clock values and clock sources can be used as the input to the synthesizer 9-44 as described in connection with the clock unit 61 of FIG. 7.

The clock unit 61 determines the value of the clock signal, $CLK_L$, based on the $CLK_D$, clock input from the P_BTS processor 9-30 and the $CLK_{RF}$ from the GPS transmitter under control on bus 9-50 of control signals from the P_BTS processor 9-30. The clock signal, $CLK_L$, connects as an input to the transmit/receive signal processor 6-27 to clock all of the digital units in processor 6-27 requiring a clock signal.

The I/Q demodulator I and Q outputs feed into two separate I and Q active filters 9-46 and 9-42, respectively. These filters function to remove residual multiplied modulation components. However, some residual jitter will remain on the I and Q sine waves produced by the I/Q demodulator 9-41 after filtering in filters 9-46 and 9-42. If the clock frequency and IF frequency match, then the I and Q outputs should be DC, however, because of the jitter, this is not the case. Depending on whether the error is positive or negative, I will lead Q or vice-versa. This leading condition is detected by the D-type flip-flop 9-47. In order to remove some of the jitter, the output of the D-type flip-flop 9-47 is further filtered to produce an error signal which is equal to half the voltage with little or no frequency error. The error signal will go either positive or negative to indicate a lower or higher frequency error. The comparator 9-48 detects the error signal and produces a digital output reflecting the magnitude of the error and that digital output is input to the microprocessor 9-30. The output from the comparator 9-48 indicates whether the input clock signal to be measured, in this case 13 Mhz, and supplied to the synthesizer 9-44 is greater than, equal to or less than the input IF frequency. Once the state of the clock has been determined, separate action is taken to retune the local clock frequency, $CLK_L$ so that the desired calibration is maintained. The window sensitivity of the comparator 9-48 is set to provide a small bandwidth (measured in parts per million) in which the oscillator can run to maintain the desired calibration setting, without triggering the high or low output condition. This bandwidth is used by the setting algorithm described below in order to calibrate the clock source.

In an alternate embodiment, a more advanced I/Q demodulator 9-41 is used in the frequency analyzer that can recover the actual bits transmitted by each monitored P-BTS of interest. These actual bits are then used to accurately identify the P-BTS and this information is communicated back to the OAM system of FIG. 8 for verification of performance and other use.

OPERATION

Network Operations

The Intranet-based P-BTS 27 deployed in cells 411-1, . . . , 411-20 for a private region 211 as shown in FIG. 3 provides the same type of services that are normally provided by a public system in public region 111 that is based, in the example described, upon the conventional GSM architecture as represented by the public wireless network 15 in FIG. 1.

The software process used to control clock operations is shown in FIG. 8 as the Frequency Monitor 8-5. A radio installation scenario for an indoor radio includes BTS Powerup, GPS receiver, warm-up, BTS update to OAM, determination of valid synchronization source, synchronization table, successful synchronization source acquisition, BTS update to OAM. The phases required by this embodiment to install a master/slave synchronized P-BTS network are defined below. These steps are provided as guidelines only as many other similar schemes are possible.

GPS receiver warm-up. The internal crystal oscillator of the slave unit requires>10 minutes to warm up to operating temperature. It may also have been pre-aged for a period of time such that the frequency change due to ageing has been reduced. Once the GPS receiver has locked onto a satellite and conditioned its local crystal oscillator it can begin to broadcast on the BCCH RF carrier that it is a master frequency source.

BTS update to OAM. As the P-BTS performs its synchronization source analysis, it updates the OAM system via the interface connection to the OAM. If the central OAM has a preferred synchronization table as described in Section 5.4.1 System configuration and guidelines, the P-BTS will acquire this list during this communication with the OAM, otherwise the Technician must manually define and load this table onto the system via the craft interface. Alternatively the slave unit can build up a list of valid master P-BTS units by demodulating and reading the BCCH RF carrier data.

Master Clocks. Within the network of FIG. 3, it is necessary to provide an accurate clock source for the radios such that the radio signals are maintained within specification and do not interfere with other nearby radios. In order to achieve this accuracy, a stable local clock sources are used in the system, but even so, over time the output frequencies of the clock sources may drift. To insure accuracy over time, the local clock sources are conditioned by a master clock signal. Very stable clock sources, include high stability quartz oscillators and atomic sources. Very stable clock sources are prohibitively expensive for all but the most specialized applications. GPS sources, although less expensive, cannot easily operate indoors or at other locations where GPS reception is poor. To overcome these problems, low cost clock sources for both the indoor or outdoor environment are employed in master slave relationships to obtain economical clock signal synchronization.

In the network configuration shown by FIG. 3, one or more of the P-BTS 27 act as masters and are supplied with a very accurate master clock source, for example, a GPS conditioned crystal source. However, any accurate source can be mounted in the master P-BTS 27-7. In the GPS case, the P-BTS 27-7 broadcasts on the radio with a very accurate master clock signal which is used to condition other slave clock sources. The P-BTS 27 that function as slaves use the frequency analyzer 9-10 of FIG. 9. The P-BTSs 27 that use the frequency analyzer 9-10 operate as described in connection with FIG. 10, FIG. 11, FIG. 12 and FIG. 13.

Figure 10:
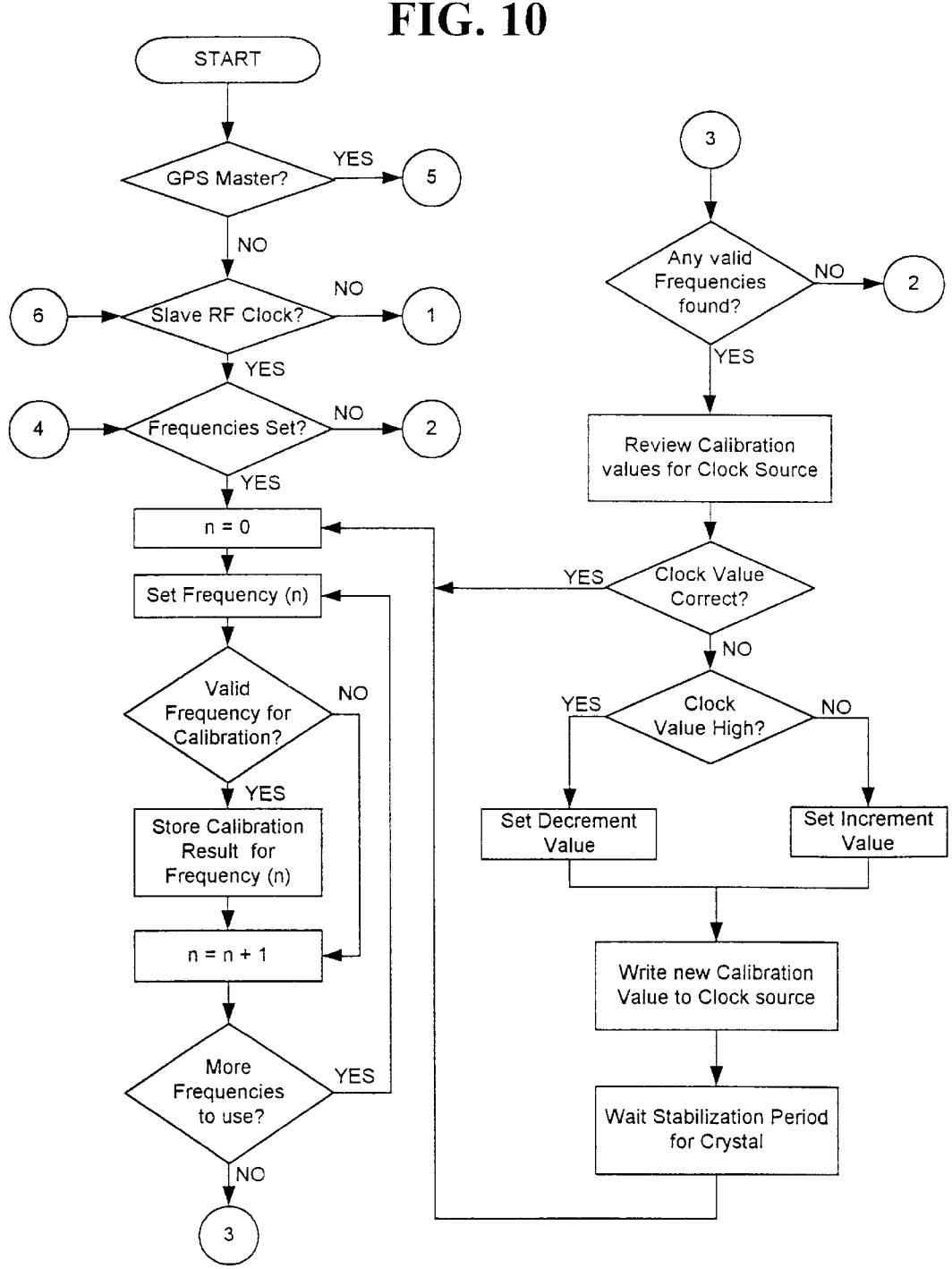
FIG. 10 depicts a flow diagram of the normal power-on operation of a P-BTS.

Clock Unit Operation—FIG. 10.

Figure 11:
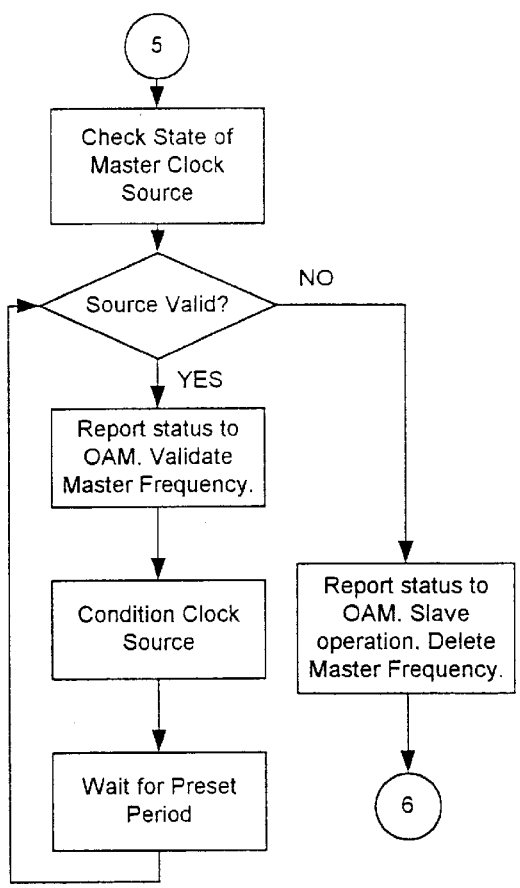
FIG. 11 depicts a flow diagram of the checking for non-slave mode of operation of a P-BTS.

Referring to FIG. 10, under normal conditions, a P-BTS when powered on will check whether or not it is to act as a master as shown by decision GPS Master?. The method used to determine if it should be a master will depend on a number of factors. These factors include the presence or absence of a primary reference internal source, this could be a GPS conditioned clock or other accurate master clock source as described in connection with FIG. 7. It is also possible for the network OAM function to instruct the P-BTS to behave as a master or slave unit. If a master or primary reference source is present (YES), then it needs to be checked to make sure it is operational as per jump 5 to FIG. 11, Source Valid?. If the source is valid (YES), then the OAM system is informed that the P-BTS in question and at a set ARFCN (Report status to OAM. Validate Master Frequency.) can act as a master source for other P-BTS in the network. While acting as a Master Source, the P-BTS must continually check that it has a valid and reliable clock source. If the source becomes invalid at any time, then the NO branch ending in jump 6 in FIG. 11 is back to Slave RF Clock? in FIG. 10. On taking the branch and jump 6, the P-BTS is required to inform the OAM system of the change in status from a master to a slave clock. On changing to slave status, the P-BTS will enter the Slave RF Clock? decision in FIG. 10. On changing status, the master P-BTS source may also be provided directly with a list of possible master P-BTSs that it could use. If this situation occurs, the OAM system must inform all P-BTS that this ARFCN is no longer to be used by the slave P-BTS to provide its reference source.

When in slave mode, the P-BTS follows the flow shown in FIG. 10. It checks to see if there is a valid frequency set (Frequencies Set?) for master P-BTSs, if this is not the case (NO), then jump 2 is taken to FIG. 12. If it is the case (YES) and using the valid set of frequencies, the slave P-BTS will select each master P-BTS frequency in turn (starting with n=0) and check for its presence. If the frequency is not valid (NO) as determined by the Valid Frequency for Calibration? decision box then the frequency is skipped and the next one on the list is examined (n=n+1). For each valid frequency for calibration, the slave P-BTS takes a number of readings on the frequency for calibration and stores the result (Store Calibration Result for Frequency (n)). As an enhancement, the scheme may also detect and store the received power level of the signal being used. Once the list of master P-BTS frequencies is completely exhausted (More Frequencies to use?), the frequency setting algorithm running in processor 9-30 examines the complete list of outputs and on detecting a valid frequency, (YES) for Any valid Frequencies found?, the results are reviewed (Review Calibration values for clock source). The output state (Clock Value Correct?) High, Correct or Low of the comparator 9-48 in FIG. 9 is then noted by P-BTS processor 9-30 for that particular frequency. If the output is viewed as being correct, then the scanning function is restarted by a return to the scanning function (n=0). If the output is viewed as being incorrect, Clock Value Correct? Is NO, then the value is tested (Clock Value High?). The output from this examination is then used to determine the clock source frequency. If the clock frequency is too high, then the clock source frequency is lowered by a single step, SET DECREMENT VALUE. Similarly, if the clock frequency is too low, then the clock source frequency is raised by a single step, SET INCREMENT VALUE. Once the new clock calibration value has been set (Write new Calibration Value to Clock source), the algorithm waits (Wait Stabilization Period for Crystal) for the new clock source frequency to stabilize before reentering the scanning function (n=0). This process continues uninterrupted until instructed to try for master P-BTS operation by the OAM system.

A number of optimizations are possible on the FIG. 10 processing.

If only one or two results are available from the scanning process, then the averaging is done by taking numerous readings from the one or two master P-BTSs over a period of time, which ranges from minutes to several days. Only at that time is the output of the algorithm used to reset the frequency of the clock source.

Several scans of the master P-BTS frequencies are averaged in order to determine the calibration setting for the master clock source.

In order to improve the stability of the system, the increment values used to set the clock source calibration are set to sufficiently small values such that they do not cause instabilities in the frequency source readings taken during the scanning process. This operation will prevent wild swings in the clock source outputs. The setting of the increments is determined, for example, via OAM.

Figure 12:
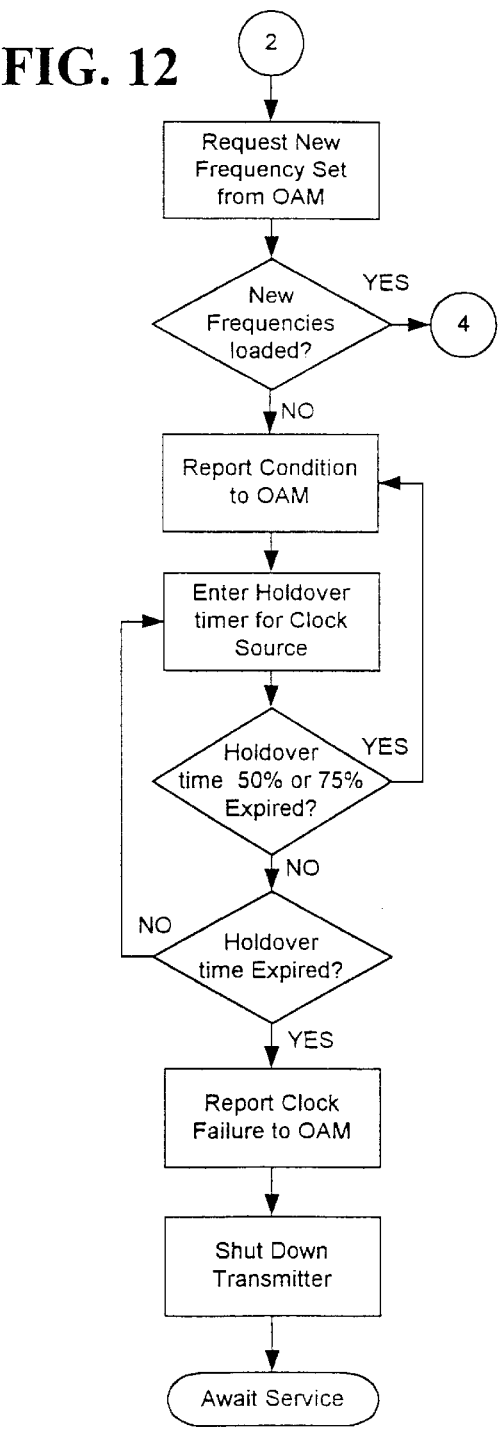
FIG. 12 depicts a flow diagram representing the frequency check operation.

Frequency Check Operation—FIG. 12

As described above, if a slave P-BTS is not offered a list of ARFCNs to use for the scanning and clock source setting process (Request New Frequency Set from OAM), then it must resort to other means of calibrating the clock source. In FIG. 12, if the decision New Frequencies Loaded? fails, the Slave P-BTS reports the failure to the OAM system (Report Condition to OAM). It is further assumed that in this case no other sources of locking the clock source are available. In this case, if a quartz crystal oscillator is used, the system can enter a holdover period (Enter Holdover timer for Clock Source), provided it has not previously be in a holdover condition without being recalibrated. This period of time is the guaranteed time over which the clock source will hold the current calibration setting. This period is usual a well known value provided by the crystal manufacturer. In this holdover condition, the slave P-BTS enters a countdown state (Enter Holdover timer for Clock Source) that allows it to inform the OAM system of its failing status. The notification values in FIG. 12 are 50% and 75%, however these can be set to other values and can include more than the two steps shown. If the OAM system takes no action to correct the situation, for example by requesting a return to scanning mode with a supplied list of master P-BTS frequencies, then the Slave P-BTS will shut down gracefully once the holdover time has expired (Holdover time Expired?). The OAM system will then need to report the failure (Report Clock Failure to OAM) and await service (Await Service) to restart the slave P-BTS with a valid reference source in order to re-calibrate the crystal before correct operation can resume.

Figure 13:
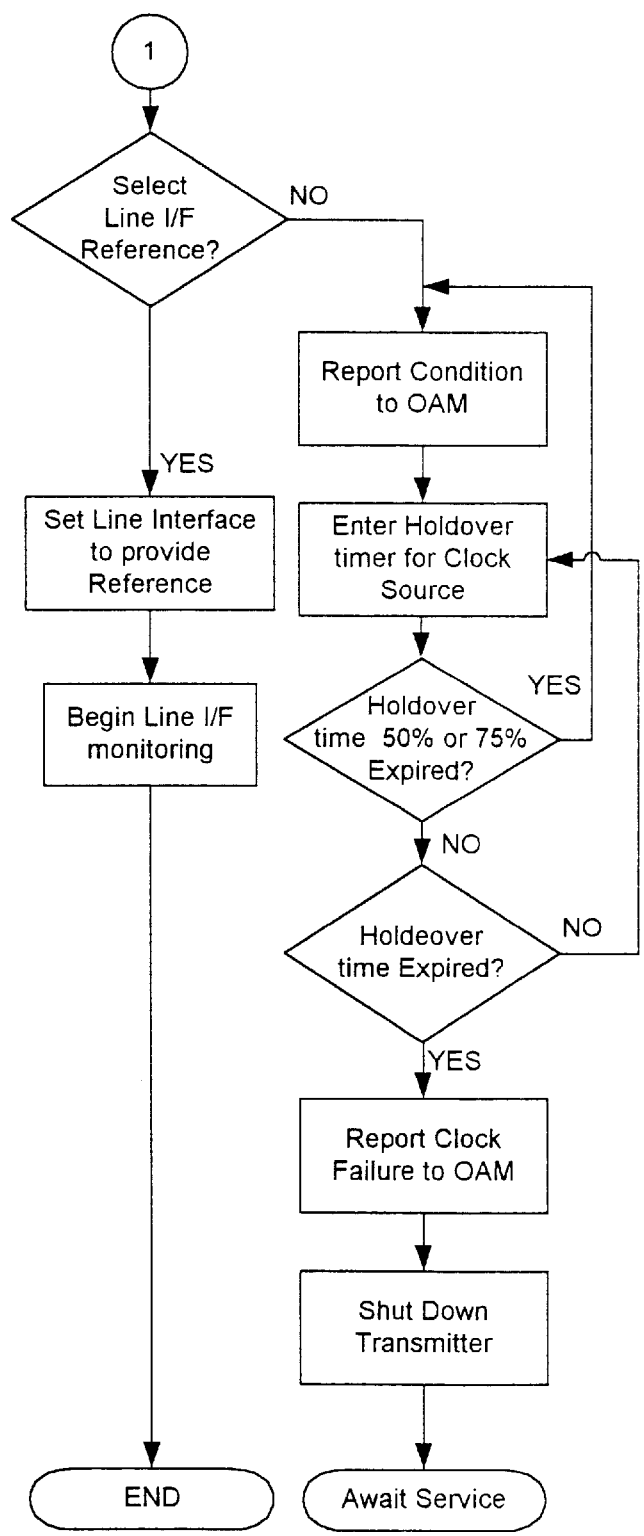
FIG. 13 depicts a flow diagram representing operation that selects a master clock based upon line interface information.

Alternate Clock Calibration Source—FIG. 13

In FIG. 13, the condition of the slave P-BTS when no other master P-BTS frequencies are available is illustrated. In this example, the slave P-BTS has the option to use the clock input from the Line Interface (Select Line I/F Reference?) supplying the network connection as the master clock source. The synchronization in this case is well understood in the literature and proceeds by selecting that source (Set Line Interface to provide Reference) and monitoring the line interface to determine the I/F frequency (Begin Line I/F monitoring). If the slave P-BTS cannot gain a reliable clock from the Line Interface or elects not to use the Line Interface and Select Line I/F Reference? is NO, then the Slave P-BTS must shut down and await service. In this case, the behavior of the slave P-BTS is equivalent to that described in FIG. 12.

While the invention has been particularly shown and described with reference to preferred embodiments thereof it will be understood by those skilled in the art that various changes in form and details may be made therein without departing from the scope of the invention.

What is claimed is:

1. A communication system extending over a cellular region and formed of a plurality of wireless cells having a plurality of base stations, respectively, where each cell covers a portion of the cellular region and where each particular cell has a particular base station comprising:
a clock unit for the particular base station wherein the clock unit comprises,
a local clock providing a local clock signal for clocking the particular base station,
a master clock source for providing one or more master clock signals, and
a clock synchronizer receiving said one or more master clock signals to form a synchronizing master clock signal for synchronizing said local clock signal; and
wherein one of said particular base stations is a master base station and one or more others of said base stations are slave base stations, and wherein only the clock unit for the master base station includes a clock distributor for distributing a distributed master clock signal to the slave base stations, and where one or more of clock units of the one or more slave base stations synchronize one or more local clock signals of the one or more slave base stations;
the master base station additionally broadcasting a master identification message identifying the master base station as a sole distributor of the distributed master clock signal.

2. The communication system of claim 1 wherein, for one or more of said wireless cells, said clock unit is a master clock unit which includes a clock distributor for distributing the synchronizing master clock signal, as a distributed master clock signal, and wherein, for one or more other ones of said wireless cells, in response to receipt of a master identification message, said clock unit is connected to be a slave clock unit receiving said distributed master clock signal only from the master clock unit.

3. The communication system of claim 2 wherein said clock unit includes a clock synchronizer receiving said distributed master clock signal whereby said distributed master clock signal is one of said one or more master clock signals distributed only by the master clock unit.

4. The communication system of claim 1 wherein said master clock source means includes a GPS receiver for receiving a GPS signal as one of said one or more master clock signals.

5. The communication system of claim 1 wherein said master clock source means includes a high accuracy crystal controlled oscillator for generating an oscillator signal as one of said one or more master clock signals.

6. The communication system of claim 1 wherein said particular base station includes a processor for processing clock information for controlling said clock unit.

7. The communication system of claim 1 wherein said clock distributor distributes the distributed master clock signal as an RF carrier.

8. The communication system of claim 7 operating with a GSM protocol and wherein only said clock distributor in the master base station distributes the distributed master clock signal as an SCH channel on a BCCH carrier.

9. The communication system of claim 1 wherein a BCCH carrier signal carries the master identification message as a message identifying the master base station transmitting that BCCH carrier as a sole distributor of the distributed master clock signal.

10. The communication system of claim 1 wherein said particular base station includes:
a local area network connection for connecting to other ones of said base stations to exchange clock information among the slave base stations in the cellular region.

11. The communication system of claim 1 wherein said base station includes a radio frequency analyzer for analyzing received radio frequency signals to detect a distributed master clock signal.

12. The communication system of claim 11 wherein said radio frequency analyzer includes comparator means for comparing the local clock signal with the distributed master clock signal to provide an error signal for indicating whether the local clock signal has a frequency greater than or less than a frequency of the distributed master clock signal.

13. The communication system of claim 12 wherein said particular base station includes a processor responsive to said error signal for synchronizing one of said one or more master clock signals.

14. The communication system of claim 1 wherein said particular base station includes:
a local area network connection for connecting to other ones of said base stations to exchange clock information among the base stations in the cellular region, and the local area network connection is used to broadcast the master identification message.

15. The communication system of claim 14 wherein said particular base station includes a processor for using said clock information to facilitate the recovery of the distributed master clock signal.

16. The communication system of claim 1 wherein said radio frequency analyzer includes comparator means for comparing the local clock signal with the distributed master clock signal to provide an error signal for indicating whether the local clock signal has a frequency greater than or less than a frequency of the distributed master clock signal.

17. The communication system of claim 1 wherein a plurality of said base stations are master base stations each associated with one or more others of said base stations acting as slave base stations and wherein only the clock unit for each of the master base stations includes a clock distributor for distributing a distributed master clock signal and where one or more of clock units of the associated one or more slave base stations synchronizes one or more local clock signals of the associated one or more slave base stations.

18. The communication system of claim 17 operating with a GSM protocol and wherein each clock distributor in each master base station distributes the distributed master clock signal as an SCH channel on a BCCH carrier.

19. The communication system of claim 17 wherein a BCCH carrier carries the master identification message as a data message identifying the master base station associated with the BCCH carrier as a sole distributor of the distributed master clock signal.

20. The communication system of claim 17 wherein each said particular base station includes:
a local area network connection for connecting to other ones of said base stations to exchange clock information among the base stations in the cellular region, and the local area network connection is used to broadcast the master identification messages.

21. The communication system of claim 1 wherein said particular base station includes:
a local area network connection for connecting the master base station to the slave base stations, wherein the slave base stations receive the distributed master clock signal and the master identification message only from the master base station over the local area network connection.

22. In a communication system extending over a cellular region and formed of a plurality of wireless cells having a plurality of base stations, respectively, where each cell covers a portion of the cellular region and where each particular cell has a particular master base station including a master clock unit for the particular master base station a method for operating the master clock unit comprising the steps of:

providing a local clock signal for clocking the particular master base station, providing one or more master clock signals, forming a synchronizing master clock signal from said one or more master clock signals for synchronizing said local clock signal; and broadcasting an identification message identifying the particular master base station as a master base station to which a plurality of slave base stations may synchronize.

23. A communication system extending over a cellular region and formed of a plurality of wireless cells having a plurality of base stations, respectively, where each cell covers a portion of the cellular region and where each particular cell has a particular base station comprising:

a clock unit for the particular base station wherein the clock unit comprises, a local clock providing a local clock signal for clocking the particular base station, a master clock source for providing one or more master clock signals, and a clock synchronizer receiving said one or more master clock signals to form a synchronizing master clock signal for synchronizing said local clock signal;

wherein one of said particular base stations is a master base station and one or more others of said base stations are slave base stations, and wherein only the clock unit for the master base station includes a clock distributor for distributing a distributed master clock signal to the slave base stations, and where one or more of clock units of the one or more slave base stations synchronize one or more local clock signals of the one or more slave base stations;

the master base station additionally broadcasting a master identification message identifying the master base station as a sole distributor of the distributed master clock signal; and a local area network connection for connecting the master base station to the slave base stations, wherein the slave base stations receive the distributed master clock signal and the master identification message only from the master base station over the local area network connection.

* * * * *